US011210461B2

(12) United States Patent
Thomson et al.

(10) Patent No.: US 11,210,461 B2
(45) Date of Patent: Dec. 28, 2021

(54) REAL-TIME PRIVACY FILTER

(71) Applicant: Interactions LLC, Franklin, MA (US)

(72) Inventors: David Thomson, Madison, NJ (US); Ethan Selfridge, Jersey City, NJ (US)

(73) Assignee: Interactions LLC, Franklin, MA (US)

( * ) Notice: Subject to any disclaimer, the term of this patent is extended or adjusted under 35 U.S.C. 154(b) by 191 days.

(21) Appl. No.: 16/027,202

(22) Filed: Jul. 3, 2018

(65) Prior Publication Data
US 2019/0013038 A1 Jan. 10, 2019

Related U.S. Application Data

(60) Provisional application No. 62/528,904, filed on Jul. 5, 2017.

(51) Int. Cl.
G06F 40/205 (2020.01)
G10L 25/51 (2013.01)
(Continued)

(52) U.S. Cl.
CPC ............ *G06F 40/205* (2020.01); *G06F 40/20* (2020.01); *G10L 15/063* (2013.01);
(Continued)

(58) Field of Classification Search
CPC ... G10L 25/51; G10L 15/063; G10L 15/1815; G10L 15/22; G06F 40/20; G06F 40/205;
(Continued)

(56) References Cited

U.S. PATENT DOCUMENTS 8,244,531 B2 * 8/2012 Erhart .................... G11B 27/28
704/249
9,245,525 B2 * 1/2016 Yeracaris ................ G10L 15/32
(Continued)

FOREIGN PATENT DOCUMENTS

WO    WO2017/039102 A1    3/2017

OTHER PUBLICATIONS

PCT International Search Report and Written Opinion, PCT Application No. PCT/US2018/040828, dated Nov. 27, 2018, 11 pages.
(Continued)

*Primary Examiner* — Michelle M Koeth
(74) *Attorney, Agent, or Firm* — Fenwick & West LLP

(57) ABSTRACT

A masking system prevents a human agent from receiving sensitive personal information (SPI) provided by a caller during caller-agent communication. The masking system includes components for detecting the SPI, including automated speech recognition and natural language processing systems. When the caller communicates with the agent, e.g., via a phone call, the masking system processes the incoming caller audio. When the masking system detects SPI in the caller audio stream or when the masking system determines a high likelihood that incoming caller audio will include SPI, the caller audio is masked such that it cannot be heard by the agent. The masking system collects the SPI from the caller audio and sends it to the organization associated with the agent for processing the caller's request or transaction without giving the agent access to caller SPI.

20 Claims, 5 Drawing Sheets

(51) Int. Cl.
*G10L 15/22* (2006.01)
*G10L 15/06* (2013.01)
*G10L 15/18* (2013.01)
*H04M 3/42* (2006.01)
*H04L 29/06* (2006.01)
*G06F 40/20* (2020.01)
*H04M 3/51* (2006.01)

(52) U.S. Cl.
CPC .......... *G10L 15/1815* (2013.01); *G10L 15/22* (2013.01); *G10L 25/51* (2013.01); *H04L 63/0407* (2013.01); *H04L 63/0414* (2013.01); *H04L 65/1023* (2013.01); *H04M 3/42008* (2013.01); *H04M 3/5175* (2013.01); *H04M 3/51* (2013.01); *H04M 2203/6009* (2013.01)

(58) Field of Classification Search
CPC ............. H04L 63/0407; H04L 63/0414; H04L 63/1023; H04M 3/42008; H04M 3/5175; H04M 3/51; H04M 2203/6009
See application file for complete search history.

(56) References Cited

U.S. PATENT DOCUMENTS

| | | | |
|---|---|---|---|
| 9,307,084 B1 * | 4/2016 | Pycko | H04M 3/5166 |
| 9,413,891 B2 * | 8/2016 | Dwyer | G10L 15/30 |
| 10,754,978 B2 * | 8/2020 | Odinak | G06F 21/64 |
| 2007/0016419 A1 | 1/2007 | Lee et al. | |
| 2010/0082342 A1 | 4/2010 | Erhart et al. | |
| 2012/0027195 A1 | 2/2012 | Shaffer et al. | |
| 2013/0231936 A1 | 9/2013 | Doren | |
| 2014/0078938 A1 * | 3/2014 | Lachapelle | H04M 3/568 370/260 |
| 2015/0195406 A1 | 7/2015 | Dwyer et al. | |
| 2015/0281446 A1 | 10/2015 | Milstein et al. | |
| 2016/0379639 A1 * | 12/2016 | Weinstein | G06F 21/6254 704/235 |
| 2017/0048698 A1 * | 2/2017 | Choffnes | H04L 43/045 |
| 2019/0164539 A1 * | 5/2019 | Schmidt | G06F 40/216 |

OTHER PUBLICATIONS

European Patent Office, Extended European Search Report and Opinion, EP Patent Application No. 18828371.7, dated Feb. 5, 2021, ten pages.

Wikipedia, "Speech analytics," Dec. 16, 2016, four pages, [Online] [Retrieved on Jan. 27, 2021] Retrieved from the Internet <URL: https://en.wikipedia.org/w/index.php?title=Speech_analytics&oldid=755068772>.

Wikipedia, "Speech recognition," Jul. 2, 2017, 21 pages, [Online] [Retrieved on Jan. 27, 2021] Retrieved from the Internet <URL: https://en.wikipedia.org/w/index.php?title=Speech_recognition&oldid=788693507>.

* cited by examiner

REAL-TIME PRIVACY FILTER

CROSS-REFERENCE TO RELATED APPLICATIONS

This application claims the benefit of U.S. Provisional Application No. 62/528,904, filed Jul. 5, 2017, which is incorporated by reference herein.

BACKGROUND

Field of Art

This disclosure relates generally to automatic speech recognition and natural language processing and in particular to automatic redaction of sensitive personal information during live communication.

Description of Art

When users speak to an agent of an organization (e.g., a call center employee), the users may provide sensitive personal information to the agent as a part of the conversation. For example, sensitive personal information may include information that identifies the user, such as the user's social security number, or other sensitive information such as the user's medical history. Despite background checks, company policies, audits, surveillance, and other attempts to prevent information leaks, it may be possible for the agent to misuse the sensitive personal information (herein after "SPI," also known by its near-synonym as "personally identifiable information," abbreviated "PII"). An agent might, for example, use the SPI for illicit purposes, sell the SPI, or inadvertently disclose the SPI, causing harm to users, the organization, the companies of the users, or the like.

Nonetheless, the organization may need the SPI from the user to complete a transaction, respond to a user request, authenticate the user's identity, or the like. What is needed is a method for allowing the agent to have an effective conversation with the user while simultaneously preventing any misuse of any SPI provided by the user during the conversation.

SUMMARY

A masking system acts as an intermediary between a caller and an agent associated with an organization during caller-agent communication (e.g., a phone call). The masking system may be configured to detect SPI that is included in caller audio and redact or otherwise mask the portions of the caller audio stream that include the SPI.

SPI may include any personally identifiable or sensitive information that the masking system is trained to recognize. Some examples of caller SPI include account balances, account numbers, login names, age or date of birth, amount (such as in dollars) of a transaction, amount paid for a service, bank account number, biometric records (e.g., voice or faceprint), birth location, credit or debit card number, credit card expiration date, credit card security code, current location, passwords, passcodes, PINs, DNA information, device identifiers, driver's license number, email address, ethnic identity, first or last name, handle or screenname, IP address, information about family or relationships, legal status, marital status, medical history or other medical information, mother's maiden name, names of medications the caller is taking, national ID card number, nationality, passport number, prescriptions, sexual identity or preferences, social security number, street address, taxpayer ID, telephone number, visa or emigration status, and web cookies.

Certain methods and components enable the masking system to determine likelihoods that the caller audio either includes SPI or that the caller audio or agent audio indicates forthcoming SPI. In some embodiments, the caller and agent audio streams are analyzed by automatic speech recognition and natural language processing components to determine what was said and the meaning of the utterances. The masking system redacts caller audio when it has determined with a certain level of confidence that the caller audio includes SPI. As a result, the agent does not receive SPI from the caller.

To incorporate caller SPI into the transactions, the masking system includes a backend channel by which the caller SPI may be passed to the organization systems without being provided to the agent.

The features and advantages described in this summary and the following detailed description are not all-inclusive. Many additional features and advantages will be apparent to one of ordinary skill in the art in view of the drawings, specification, and claims hereof.

The figures depict an embodiment for purposes of illustration only. One skilled in the art will readily recognize from the following description that alternative embodiments of the structures and methods illustrated herein may be employed without departing from the principles of the embodiment described herein.

DETAILED DESCRIPTION

Figure 1:
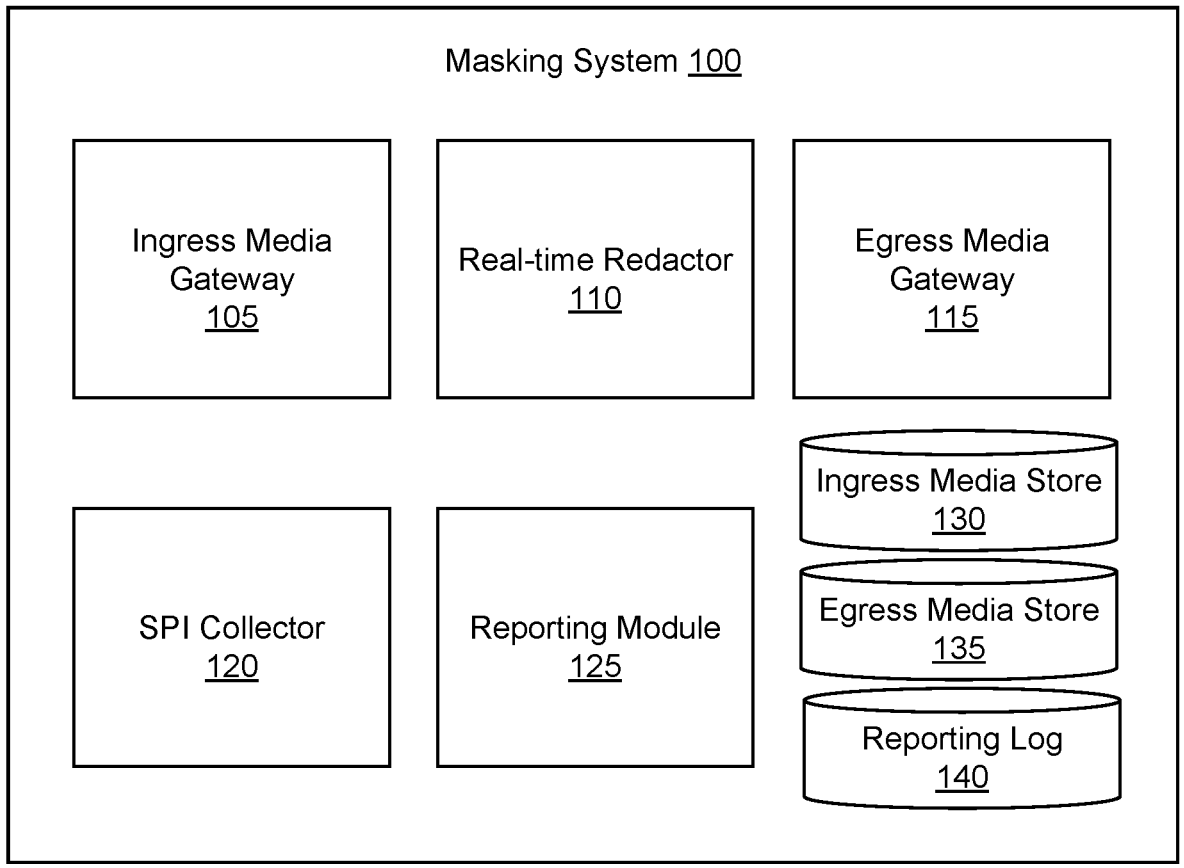
FIG. 1 is a high-level block diagram of a system architecture for a masking system 100, in accordance with an embodiment.

FIG. 1 is a high-level block diagram of a system architecture for a masking system 100, in accordance with an embodiment. The masking system 100 includes various modules and data stores that facilitate masking sensitive personal information (SPI) of a caller from an agent during communication between the caller and the agent. The masking system 100 includes an ingress media gateway 105, a real-time redactor 110, an egress media gateway 115, an SPI collector 120, a reporting module 125, an ingress media store 130, an egress media store 135, and a reporting log 140. Although audio in the form of a phone call is used as an example communication medium throughout this document, the masking system may be used to mask SPI for other forms of communication. For example, besides masking SPI in phone calls, the masking system 100 may be used to redact SPI from text messages, internet messages, video conferences, and the like. Computer components such as web servers, network interfaces, security functions, load balancers, failover servers, management and network operations consoles, and the like are not shown so as to not obscure the details of the system architecture. Additionally, the masking system 100 may contain more, fewer, or different components than those shown in FIG. 1 and the functionality of the components as described herein may be distributed differently from the description herein.

The ingress media gateway 105 manages incoming and outgoing media to the caller. In some embodiments, the ingress media gateway 105 may be configured to use Session Initiation Protocol/Media Resource Control Protocol (SIP/MRCP) or other pluggable signaling protocols. In some cases, the ingress media gateway 105 may also employ protocols for handling data streams with high throughput and low latency, for example, using Real-time Transport Protocol (RTP). Data received at the ingress media gateway 105 from a caller is provided to the real-time redactor 110. In various embodiments, the real-time redactor may respond with a redaction control signal. A redaction control signal provides an indication to the ingress media gateway about whether audio received from the caller should be sent to the agent, or whether the caller audio should be masked such that the agent cannot hear SPI information included in the caller audio. In response to redaction control signals received from the real-time redactor 110, the ingress media gateway 105 may forward the caller audio to the egress media gateway 115 or may not forward the caller audio to the egress media gateway 115, thus masking a portion of the caller audio from the agent.

In some embodiments, the ingress media gateway 105 may be configured to persist the whole unmasked call recording. In such cases, the caller audio may be stored on the ingress media store 130. In some cases, the data on the ingress media store 130 may be used by the real-time redactor 110 to determine whether caller audio includes SPI. The data stored on the ingress media store 130 may be encrypted.

The real-time redactor 110 detects or anticipates SPI in caller audio received from the ingress media gateway 105. In some embodiments, the real-time redactor 110 may additionally or alternatively receive agent audio from the ingress media gateway 105, and may use the agent audio to predict whether SPI is likely to be present in upcoming caller audio.

In various embodiments, the real-time redactor 110 may be configured to perform automated speech recognition (ASR) and natural language processing (NLP). The real-time redactor 110 may also include trained computer models for predicting whether a given portion of caller audio includes SPI and for predicting whether a given portion of caller audio anticipates SPI in future caller audio. When the real-time redactor 110 generates a prediction of a high likelihood that the caller audio includes SPI, it sends a redaction control signal to the ingress media gateway 105 indicating that a portion of the caller audio is likely to contain SPI, and thus should not be sent to the agent. The redaction control signal can also include information indicating when the ingress media gateway 105 should stop masking caller audio from the agent. Additional information about redaction methods that may be employed by the real-time redactor 110 are described in FIGS. 3A-3D.

The egress media gateway 115 manages required protocol mediation and streaming of media (e.g., audio) to and from an agent device. Like the ingress media gateway 105, the egress media gateway 115 may be optimized for low latency handling of streamed data. The egress media gateway 115 receives masked caller audio from the ingress media gateway 105 and configures the audio to be streamed to an agent device. In some embodiments, the egress media gateway 115 also receives agent audio and sends it to the ingress media gateway 105 for transmittal to the caller. The egress media gateway 115 may be configured to persist the masked call recording to disk. In such a case, the masked call recording may be saved to the egress media store 135. Data saved to the egress media store 135 is encrypted.

The SPI collector 120 manages SPI data collected from caller audio during the interaction between the caller and the agent. As such, the SPI data collector 120 is responsible for keeping SPI in memory. In one embodiment, the SPI may be keyed to a unique call identifier. In one embodiment, no SPI is persisted to disk. The SPI collector may receive SPI from the real-time redactor 110. That is, when the real-time redactor 110 determines that a portion of the caller audio is likely to contain SPI, the SPI information may be sent to the SPI collector 120 for use during the interaction between the caller and the agent. The SPI collector 120 enables an agent device to access the SPI information for additional processing. For example, an agent may want to initiate a payment for the customer via the agent device (e.g., an agent desktop application). After initiation of the payment process by the agent, a backend payment service on the agent device may request the SPI information (e.g., a credit card number) from the SPI collector 120. The payment transaction can thus be completed without the agent receiving the SPI information. Consumers of these interfaces may be within a secure payment card industry (PCI) zone. In some embodiments, the SPI collector 120 also supports tokenization for payment processing systems that require it.

To securely communicate SPI data to an agent device, the SPI collector 120 may expose standard representational state transfer (REST) interfaces with transport layer security (TLS) enabled. Additionally, SPI collected by the SPI collector 120 for use during the caller-agent interaction is not stored to memory after the interaction is completed.

The reporting log 140 receives metadata related to information processed by the masking system 100. In one embodiment, the reporting log 140 may be a transactional database. The information can then be accessed for reporting. In one embodiment, SPI data is not stored to the reporting log 140.

In some embodiments, the masking system 100 includes a reporting module 125. The reporting module 125 may generate reports about high-level metrics associated with the masking process. Such reports may be based on the data stored in the reporting log 140. Examples of reports for overall system performance include estimates of speech recognition accuracy, values and statistics related to traffic, a percentage of calls with SPI, and a percentage of types of redaction (e.g., whether the agent or the real-time redactor 110 initiated the redaction). Examples of reports that relate to user experience include estimates of redaction accuracy, a number of times customer utterances are unrecognizable, a number or SPI events detected, a categorization of the types of SPI events detected, and an average number of words or digits that are redacted. Reporting data from the reporting module 125 can help with improving the masking system 100. For example, the reports may indicate that specific models used by the real-time redactor 110 need additional training.

Figure 2:
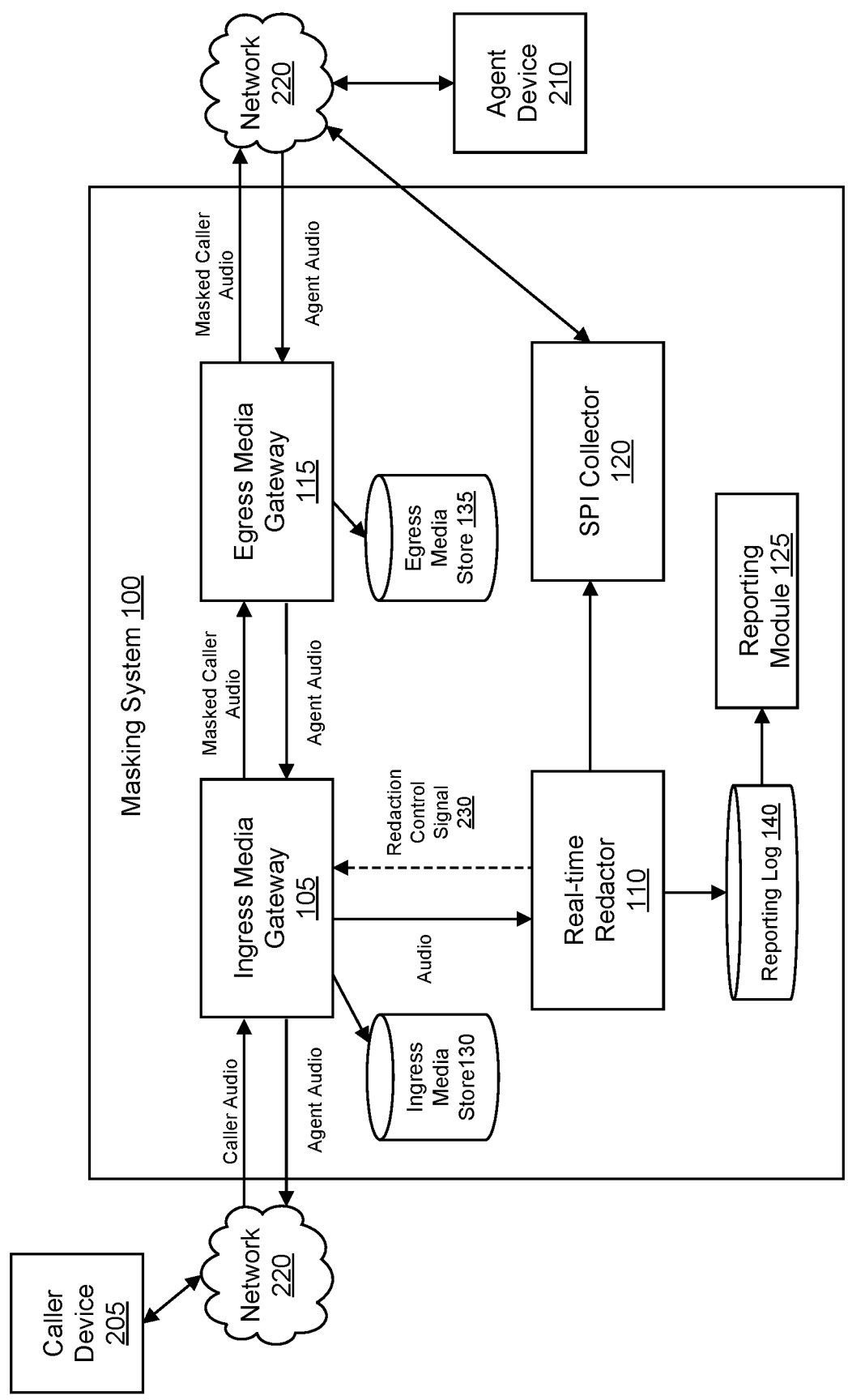
FIG. 2 is a high-level block diagram illustrating a system environment for a masking system as well as interactions between various components of the masking system, in accordance with an example embodiment.

FIG. 2 is a high-level block diagram illustrating a system environment for a masking system as well as interactions between various components of the masking system, in accordance with an example embodiment. Specifically, FIG. 2 demonstrates an example embodiment in which a caller at a caller device 205 may communicate with an agent of an organization at an agent device 210 with the masking system 100 acting as an intermediary.

A caller device 205 can be a telephone, a personal or mobile computing device, such as a smartphone, tablet or notebook computer, a desktop computer, or another device by which the user can communicate with an agent. In some embodiments, a caller device 205 may be any device that supports communication over a network using e-mail, interactive text chats, or voice over Internet protocol (VOIP).

A caller's call signal, as sent to the masking system 100 from a caller device 205, may include voice, screen taps or clicks, video input, or touch tones which are also known as dual-tone multiple frequency (DTMF). Once the masking system 100 determines that the caller is providing SPI, the caller audio is masked, i.e., the masking system 100 does not provide the portion of the caller audio stream containing the SPI to the agent (or provides only a subset thereof). Once the masking system 100 determines that the caller is no longer providing SPI, the masking system 100 recommences providing the caller's audio stream to the agent.

The caller audio is sent to an agent at an agent device 210 via the masking system 100. Agents associated with an organization may include human agents that handle caller requests. In some embodiments, an ASR system or outsourced human operator may identify a caller's intent to communicate with an agent associated with the organization and direct the caller to be connected for communication with an agent accordingly.

An agent communicates with a caller via an agent device 210. An agent device 210 may include a computer terminal with a display or desktop where information appears such as a status of a caller's account with the organization, or information about what data the agent is collecting from the caller. In one example embodiment, the agent may click on a screen icon or tab into a field in the desktop to enter information from the caller or to indicate that the caller is being asked to provide information. A desktop of an agent device 210 may display information from the caller and whether the caller information is validated, e.g., whether an account number provided by the caller matches the account number in the caller's customer record. When information from the caller is redacted, other indicators may appear on the desktop of the agent device 210 such as an asterisk or other symbol in place of a digit. As other examples, a volume unit meter, bar graph, or an image of a speech waveform may appear on a screen of the agent device 210 to indicate that the caller is speaking although the agent may not be able to hear the caller due to the audio masking.

In one embodiment, the agent device 210 may be a computer terminal that is connected to a call center system that distributes calls to agents, controls the transmission of information to and from agents and their desktops, manages or accesses customer information and communicates with the redaction system. In some embodiments, an agent device 210 may be a telephone, a mobile computing device such as a smartphone, a tablet or notebook computer, a desktop computer, or another device by which the agent can communicate with a user. In one embodiment, the agent device is a computer equipped with an agent desktop system which can interact with the masking system to obtain required SPI from a user without the SPI ever being presented or available to the agent.

Caller devices 205 and agent devices 210 may interact with the masking system 100 via the network 220, which may comprise a combination of local area and wide area networks employing wired or wireless communication links. In some embodiments, all or some of the communication on the network 220 may be encrypted.

In one embodiment, the masking system 100 includes a telephony server. Using this architecture, a communications link can be implemented to provide an interface between the caller device and the telephony server. For example, a communications link may be a dial-up connection or a two-way wireless communication link.

In another embodiment, the masking system 100 may include a gateway server. The caller interacts with such an interactive response server by e-mail, interactive text chats or VOIP. The gateway server runs customized open source e-mail, www server software or SIP. Further, a gateway server in accordance with this embodiment is designed to conduct e-mail, interactive text chat, or VOIP transactions with callers, while also forwarding or otherwise providing data to, and receiving data from, other elements of the masking system 100. Using this architecture, the communications link is implemented by any means of providing an interface between the caller's computer and the gateway server. For example, a communications link may be a dedicated interface, a single network, a combination of networks, a dial-up connection or a cable modem.

The masking system 100 receives caller audio (or another form of communication medium) from the caller device 205 at the ingress media gateway 105, for example, via network 220. In one embodiment, the ingress media gateway 105 receives an ongoing stream of caller audio. For example, in the case of a phone call, the ingress media gateway 105 receives a stream of caller audio data while simultaneously sending audio data to the real-time redactor 110, sending masked caller audio data to the egress media gateway 115, and receiving and forwarding agent audio on to the caller device 205. In some embodiments, the audio received at the ingress media gateway 105 may be stored in an ingress media store 130 as encrypted data.

The ingress media gateway 105 sends caller audio to the real-time redactor 110. Depending on the embodiment, the real-time redactor 110 may apply ASR, NLP, or predictive modeling techniques to determine a likelihood related to whether the caller audio contains SPI. In some embodiments, the real-time redactor 110 determines a likelihood that future caller audio received by the ingress media gateway 105 will include SPI, for example, using NLP techniques to identify prompting phrases such as "My social security number is—."

In one embodiment, the real-time redactor 110 may use automatic speech recognition (ASR) to identify the content of caller or agent audio and may use natural language processing (NLP) to classify the intent, purpose, or meaning of the identified content. That is, the real-time redactor 110 uses ASR and NLP together to interpret what a caller says and wants. In one example, the ASR may recognize a credit card number, prompting the real-time redactor 110 to send a redaction control signal 230 to the ingress media gateway 105 and to send the digits of the card number to the SPI collector 120.

In one alternative embodiment, the caller audio may be forwarded to an outside human agent (i.e., a human not affiliated with the organization) to confirm information about caller audio that the real-time redactor 110 could not classify with confidence. This type of forwarding may occur instead of, in parallel with, or after sending the audio to ASR or NLP components of the real-time redactor 110. In a first example, if the ASR or NLP models are not equipped to understand particular information (e.g., if they cannot recognize or classify driver's license numbers comprising alphanumeric strings), the audio may be played to the outside human agent who then transcribes the string. In a second example, the ASR or NLP models may attempt to interpret a portion of audio and may fail to determine a prediction about the caller audio with a confidence score above a predetermined threshold, in which case, the audio may be forwarded to an outside human agent for interpretation. In various embodiments, the strategy of providing outside human agents to assist ASR and NLP may be used whenever audio is played to an ASR, for making the decision to redact, un-redact, or end redaction in collecting and interpreting information from the caller.

In one embodiment, the NLP models may be trained to recognize SPI using a positive training set (e.g., examples of SPI), and a negative training set (e.g., examples of caller input that does not contain SPI). For example, a first model may be trained to recognize SPI in the form of DTMF, and a second model may be trained to recognize SPI in the form of human speech. The effort required to produce training sets for training the models may be reduced via active learning on prior input. For example, caller audio provided as a response to a prompt such as "What is your credit card number?" could be automatically placed into a positive training set representing SPI, on the assumption that the following caller audio is highly likely to represent a credit card number, which is one form of SPI.

The real-time redactor 110 generates confidence values related to caller audio and agent audio. The confidence values may represent a predicted likelihood that received or future caller audio contains SPI. The confidence values may be determined based on the outputs of the ASR and NLP modules. If a confidence value for a portion of the caller audio exceeds a predetermined threshold value, the real-time redactor 110 may send a redaction control signal 230 to the ingress media gateway, indicating what portions of the caller audio should be masked and how long the redaction should last.

In some embodiments, the ingress media gateway 105 delays providing the caller audio to the egress media gateway 115 (and thus to the agent) until the real-time redactor 110 has determined whether the caller is providing SPI. The ingress media gateway 105 may delay caller audio by storing the caller audio in a memory buffer, such as the ingress media store 130, and playing the caller audio from the memory buffer a period of time later, where the period of time corresponds to the delay. When the real-time redactor 110 determines that the caller has stopped provided SPI (e.g., has said "My phone number is 555-123-4567, and"), the modules of the masking system 100 may take an action to catch up with the caller audio in real time. For example, the ingress media gateway 105 or egress media gateway 115 might partially or entirely eliminate pauses in subsequent caller audio, or may provide the caller audio at a faster speed when providing the subsequent caller audio to the agent device 210. The ingress media gateway 105 or egress media gateway 115 may also replace portions of redacted caller audio with a shorter substitute such as "comfort signal" sounds, random DTMF tones, or the like. In one embodiment, upon detection of SPI in the caller audio stream, the real-time redactor 110 may predict a length of the expected SPI and may indicate in a redaction control signal 230 to the ingress media gateway 105 an appropriate predicted delay time associated with the predicted SPI.

In one embodiment, the agent hears silence or any unredacted audio while the masking system 100 masks caller audio. In another embodiment, a comfort signal is played to alert the agent that the caller is speaking or is expected to speak. The comfort signal may also indicate that the caller is inputting DTMF, the caller is providing other data as input, the caller is still on the line, or to convey other indications of call status. Examples of a comfort signal include a text-to-speech rendering of the caller's voice speaking random digits, a distorted version of the caller's voice, altered such that the speech is unintelligible, a voice signal responsive to the caller's voice, a signal such as the "wah-wah" voice heard in an old Charlie Brown cartoon when adults are speaking, a voice signal that is synthesized to have an average pitch, average range, or spectral characteristics similar to the caller's voice without intelligible content, a distorted version of the caller's voice, scrambled so that the audio segments are out of order, a sequence of random phonemes or digits, typing sounds, a series of tones or music, or white or pink noise.

In one embodiment, the caller audio, as played to the agent, is delayed so that the masking can begin at a point earlier in the caller audio, for example, where the real-time redactor 110 identified the start of a string of SPI. Such a delay may be fixed or variable, according to various embodiments.

A fixed delay may be inserted into the caller audio to compensate for a delay in masked caller audio. For example, if the ASR system needs four digits to reliably detect a digit string, the caller speaks four digits in one second, and the ASR requires half a second to detect speech, then masking may occur 1.5 seconds after the caller begins speaking the digit string (i.e., one second for the caller to speak four digits and 0.5 seconds for the real-time redactor 110 to process and understand the four digits). In this example, the ingress media gateway 105 may delay the caller audio to the agent by 1.5 seconds so that masking begins just as the caller begins speaking the digit string in the masked caller audio that is heard by the agent.

A variable delay may be inserted into the caller audio, where the delay is responsive to one or more conditions detected by the real-time redactor 110 such as (a) detection of an indicator that the dialog is at a state (e.g. early in the call or a point where SPI has not yet been provided) where the agent is likely to ask for SPI, (b) an indication of where the agent is in his/her script (a set of instructions and verbiage the agent may read to the customer that the agent follows), (c) detection of the agent setting a signal requesting a mask, (d) detection of the agent asking for information that may be classified as SPI, (e) detection of a preamble from the caller such as, "My number is," (f) detection of an indication via a mouse, keyboard, or other input device from the agent such as tabbing or clicking onto an input field (e.g. a birthdate field), suggesting that the conversation may shift to a SPI-related topic, (g) detection of a request by the customer (e.g. account balance or closing an account) that will likely require him/her to provide authenticating information, and (h) estimates of the probabilities that detections in (a) through (h) are correct.

Response time of the masking system 100 is one consideration. To maximize accuracy, the ASR 320 and NLP 330 should hear as much acoustic evidence (e.g. introductory phrasing by the caller and agent and, in some cases, a portion of the SPI audio) as possible, suggesting that the redaction decision should be made as late as possible. For the highest security, the agent should hear the minimum amount of SPI, suggesting that the redaction decision should be made as early as possible. A favorable balance may be struck between the two objectives if the response time of the redaction system is short. There are several sources of latency, including the network, internal platform communication, audio packetizing or chunking, and the speech recognizer, all of which can be controlled to some degree.

Returning to FIG. 2, the egress media gateway 115 receives a stream of caller audio from the ingress media gateway 105. Responsive to redaction control signals 230 received from the real-time redactor 110, the ingress media gateway 105 may provide masked caller audio or instructions to the egress media gateway 115 for catching up to the live caller audio stream in view of previously delayed caller audio. In addition to forwarding masked caller audio to the agent device 210, the egress media gateway 115 also manages agent audio that is received from the agent device 210 and sent on to the ingress media gateway 105 for forwarding to the caller device 205 and to the real-time redactor 110, in some embodiments. The egress media gateway 115 may be configured to store encrypted communication data, such as the agent audio received from the agent device 210 or the masked caller audio received from the ingress media gateway 105. Such data may be stored in the egress media store 135.

There are several criteria that may be sued to determine when masking should end, depending on which portions of SPI are redacted and which are permitted to be played to an agent. One or more of the following criteria may be used, individually or in combination.

As a first example, if a requirement exists that a predetermined number of digits are to be masked, then a process may count digits output from an automatic speech recognizer and end masking once this number of digits has been masked. For example, if the requirement is that at least four digits of a phone number shall be redacted, and the first four digits are played to an agent before masking begins, then the system may restore audio (i.e., end redaction) after the customer has spoken eight digits. In this example, the agent would hear the first four and last two digits of a 10-digit phone number.

Similarly, if a requirement exists that a predetermined number of words or seconds are to be masked, then a process may count words or time in seconds and redact as in the previous example for digits.

If a requirement specifies that as much of the digit string as possible should be redacted, then audio may be masked from the point where redaction begins until an estimate of the end of the SPI segment. A first possible metric that may be used to estimate the end of an SPI segment is a point when the caller is determined, by a predetermined number of seconds of silence, to have stopped speaking. As another possible metric, the masking system 100 may recognize a word that is not part of the expected caller response. For example, if a caller is asked for a social security number, redaction may end when the caller says a word that is not a digit. This criterion is responsive to the identity and nature of the requested information (e.g., a given number of digits, an alphanumeric string, a date in the past or in the future, a four-digit PIN, etc.). The masking system 100 may also recognize that the requested information has been spoken. For example, if a 10-digit phone number is requested, redaction may end after the 10th digit is heard. If a date is expected, redaction may end once a valid date has been recognized. The length of the requested information varies depending on the content, then the system may take the content of the response into account when determining whether the response is complete. For example, if the phone number begins with "1," then the system may wait for 11 digits. The masking system may also know to end redaction if the information spoken by the caller passes a database check. For example, if the caller is asked for a four-digit PIN, the caller speaks four digits, and the digits match the number in the caller's record, redaction may end. As a final example metric, the masking system 100 may determine from pitch inflection signals that the caller has completed a response. For example, if people typically lower their pitch at the end of a phrase, the masking system 100 may expect that the caller is finished once a falling pitch is detected.

In still another example embodiment, redaction may end after a predetermined amount of time has passed. The predetermined amount of time may depend on nature of the information, such as the number of digits being collected.

In some cases the organization may require SPI from the caller, for example, to authenticate the caller or to complete a transaction for the caller. During a communication session between the caller and the agent, the SPI collector 120 may receive SPI from the real-time redactor 110. When caller SPI is needed by the organization, the agent device 210 can query the SPI collector 120, which provides the SPI directly to the backend system of an agent desktop on the agent device 210 such that the organization receives the SPI without the agent ever receiving the SPI. For example, the agent might indicate via the agent desktop on the agent device 210 that SPI is required, and the agent device 210 can communicate with the SPI collector 120 to receive the SPI as provided by the caller why the ingress media gateway 105 masks the SPI from the caller audio received directly by the agent.

In some embodiments, data may be saved to the reporting log 140 by the real-time redactor 110. Data saved to the reporting log 140 does not include SPI, but may include metrics that can be used to analyze the performance of the masking system 100. For example, the reporting log 140 may store information about how often caller audio is identifiable by the ASR system, and number of times audio is redacted, among other possible metrics. In some embodiments, the reporting module 125 generates reports related to metrics stored in the reporting log 140. Such reports may be useful for a system administrator, for example, to understand how the performance of the masking system 100 could be improved.

So that the masking system 100 can be improved over time by training on field data, audio data from the reporting log 140 may be used to tune the system for maximum performance. This tuning process may comprise using audio recordings, transcriptions of all or part of caller-agent conversations, and other log files to build models for the components of the real-time redactor 110 and various decision thresholds. Log files may contain a record of agent actions, the nature and endpoints for redaction events, instances of segments not redacted but where a confidence score indicating the likelihood that the instance contained SPI was high (but still below a threshold that signals a SPI event), a recitation of the dialog between the caller and the agent, the caller's phone number or other calling device identifier, and information from the caller's account or history with the organization.

The call may be captured in stereo, with a separate channel for agent and caller, or in mono, where both sides of the conversation are combined into a single audio signal.

The entire call may be captured or a portion may be captured, such as the redacted segments or segments with a high confidence score, optionally including a few seconds before or after the segment. In one embodiment, the ASR, NLP, confidence estimators, and SPI detection is improved based on data collected from a service, either in real-time where improvements are fed back into the components as the system is running, or in batch mode where people and/or machines work to analyze the data and construct improvements to be deployed at various times.

There are various scenarios in which SPI can be detected and redacted by the masking system 100. FIGS. 3A-3D illustrate some possible processes by which the masking system 100 may redact SPI in different situations.

Figure 3A:
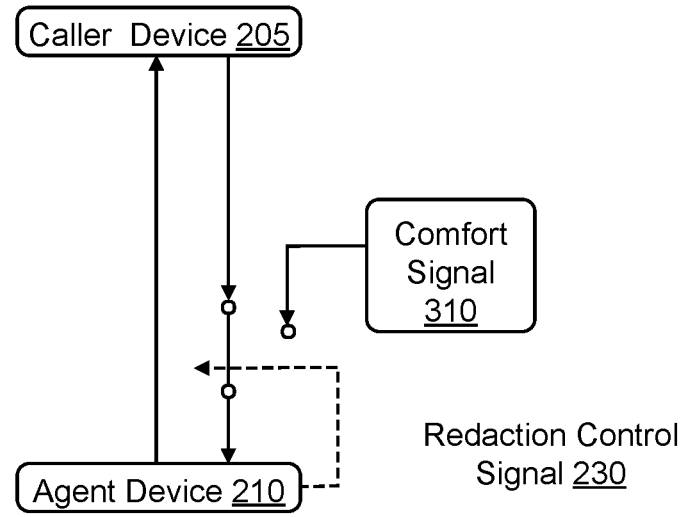
FIG. 3A illustrates an embodiment in which SPI masking is prompted by an agent.

FIG. 3A illustrates an embodiment in which SPI masking is prompted by an agent. In one embodiment, an agent may expressly set a signal requesting a mask of caller audio, such as by pressing a button in a user interface of the agent desktop on the agent device 210, clicking a screen icon, or tabbing into a field designed for collecting information from a caller. For example, the agent might press such a button to manually initiate collection of SPI by the masking system 100, such as by pressing a "collect caller's credit card number" button during a sales interaction with the caller. The user interface element may, for example, be a screen icon, key on a keyboard, or button on a console or mouse. In this example embodiment, the redaction control signal 230 may be received from the agent device 210 at the egress media 115 gateway or the ingress media gateway 105, causing the masking system 100 to initiate redaction of SPI by masking caller audio. The real-time redactor 110 collects the SPI from the caller and a comfort signal 310, such as a sound to indicate that SPI is being collected by the masking system 100, may be routed to the agent device 210 in place of the caller audio from the caller device 205. In one embodiment, masking and automatic speech recognition may be initiated by a manual signal from the agent, as previously described. In another embodiment, the manual signal from the agent may be combined with other inputs, including audio from the agent and audio from the caller as features indicating to the masking system 100 whether redaction should be initiated.

In one embodiment, the scenario of FIG. 3A begins with the masking system 100 in standby (e.g., not testing caller audio for SPI). The agent sets a signal requesting a mask, for example, by clicking on or tabbing into an SPI information request field, and the agent requests the SPI from the caller. In response to the signal from the agent, an ASR system begins listening to one or both sides of the caller audio and the agent audio from the conversation. In one embodiment, the masking system may be completely disconnected from the communication between the caller and the agent until the agent sends the redaction control signal 230 to the masking system 100. An advantage of such a disconnected embodiment is that fewer resources may be used since the redaction platform and equipment needed to connect the masking system 100 to the client device 205 and agent device 210 does not need to be active when not in use.

The masking system 100 detects the beginning of SPI and begins masking. This detection may be based on a combination of a signal from the agent device 210, and agent request, a caller preamble, or the requested information. A comfort signal may be played to the agent so the agent knows that the caller is still speaking.

The ASR, which may be a component of the real-time redactor 110, processes the masked audio (and preceding audio if appropriate) to extract relevant content, which may be SPI or some other response from the caller such as a question or a comment that the information is unavailable. As SPI is recognized, symbols, such as asterisks, may be displayed on the agent desktop to indicate to the agent that the SPI is being collected while it is still masked from the agent.

The real-time redactor 110 determines that the caller input is complete, either based on completion criteria such as receipt of a certain number of alphanumeric characters, or based on a silence gap in the caller audio. The extracted SPI from the caller audio is forwarded, via the SPI collector, to the organization for processing. The extracted content may include the requested information, an indication that the requested information was not provided, an indication that no response was given, or classifications of other relevant questions or comments that the caller may have spoken.

When the masking system 100 determines that the caller has stopped providing SPI, the masking system 100 unmasks the stream of caller audio. Depending on the content of the masked segment, part or all of the caller audio may be "unredacted," i.e., replayed to the agent. For example, if, rather than replying with a credit card number, the caller replied to an agent prompt by saying "I don't have a credit card," the masking system may replay the masked caller response for the agent so the agent can respond accordingly. If appropriate, the caller audio may be sped up on playback to catch up to real time. Some of this replay can begin while masking is still active.

In some embodiments, the masking system 100 may return a variety of messages to the agent after the caller responds to a prompt, depending on the caller response, including that the number was recognized correctly and it is valid, the number was recognized correctly but was not valid, the caller appeared to provide a number but the confidence of the masking system 100 that a complete number was provided is low, the customer responded but did not provide a number, the caller responded but the masking system 100 could not determine what was said, a noise was received but no speech, it was not clear what was said or whether the caller spoke, the caller said nothing, or the customer provided a response in the form of DTMF.

The following is a sequence of actions from one example scenario for use in obtaining a caller's credit card number as part of a sales call.

A "collect caller's credit card number" screen or field appears on a screen of the agent device 210. The data entry field is highlighted, indicating that the agent activated a collection process or is in a mode where he/she is likely to ask the caller for a credit card number.

The agent asks, "May I have your credit card number please?" or "Please say or dial your credit card number."

The caller replies, "2910-9920-1973-4402." The agent hears a comfort signal as the caller says his/her card number. As the caller speaks, a series of asterisks appear, nominally one per digit in the credit card number, in a field labeled "card number" so that the agent knows the caller is speaking. Alternatively, a VU meter shows audio energy.

A message appears on the screen of the agent device 210, "Card number received."

The agent says, "Thank you. One moment please."

The organization system checks the card number against the customer profile or other database to confirm that it is valid."

A message appears on the agent's screen, "card number confirmed."

The agent advises the caller, "Your number went through, so you're all set."

Figure 3B:
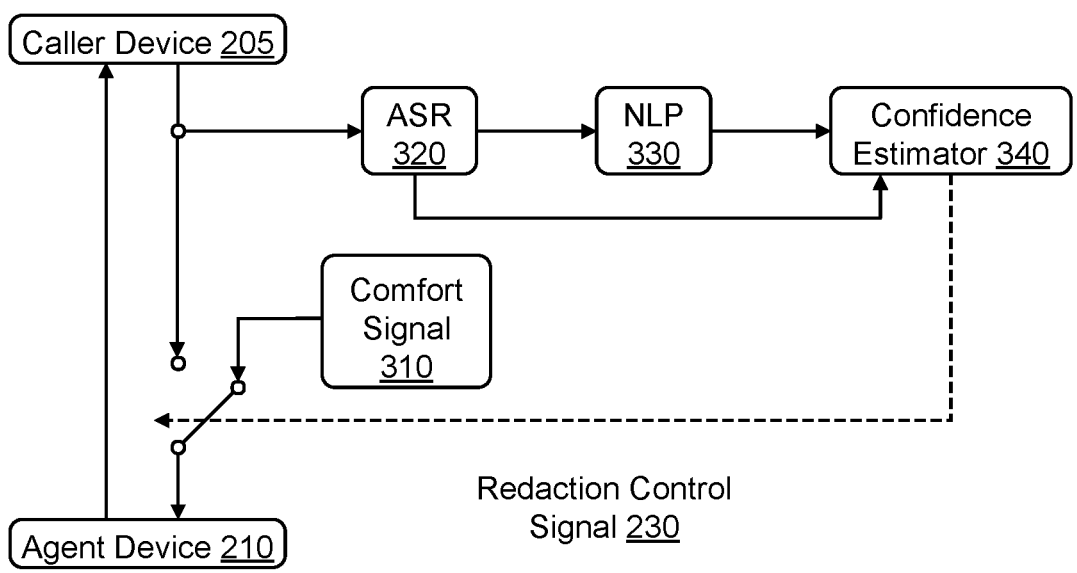
FIG. 3B illustrates an example embodiment in which SPI collection is prompted by a caller introduction.

FIG. 3B illustrates an example embodiment in which SPI collection is prompted by a caller introduction. That is, the masking system 100 initiates masking of caller audio in response to introductory phrasing (e.g., a preamble) from the caller or (depending on a length of initial SPI the agent is allowed to hear) a partial SPI string from the customer. For example, if the caller says the phrase, "My phone number is," the masking system 100 recognizes that the caller will likely provide a phone number soon.

An automatic speech recognizer (ASR) 320 transcribes the caller audio and sends the transcription to a natural language processor (NLP) 330. The NLP 33—acts as an SPI detector, where phrases spoken by the caller are used as features to give clues as to whether the caller is saying SPI or is about to say SPI. In one embodiment, the NLP 330 may also track the state of the conversation to help make this detection. Results from both the ASR 320 and the NLP 330 may be provided as input to a confidence estimator 340. The ASR 320, NLP 330, and confidence estimator 340 may all be components of the real-time redactor 110, in accordance with an embodiment. The confidence estimator determines a certainty (e.g., a confidence score or probability) that the caller is about to or has begun to provide SPI. If the confidence estimator 340 determines that there is a high likelihood that the caller is providing SPI or is about to provide SPI, then a redaction control signal 230 may be sent to the ingress media gateway 105 and the caller audio is masked while the real-time redactor 110 and the SPI collector 120 collect the caller's response.

Figure 3C:
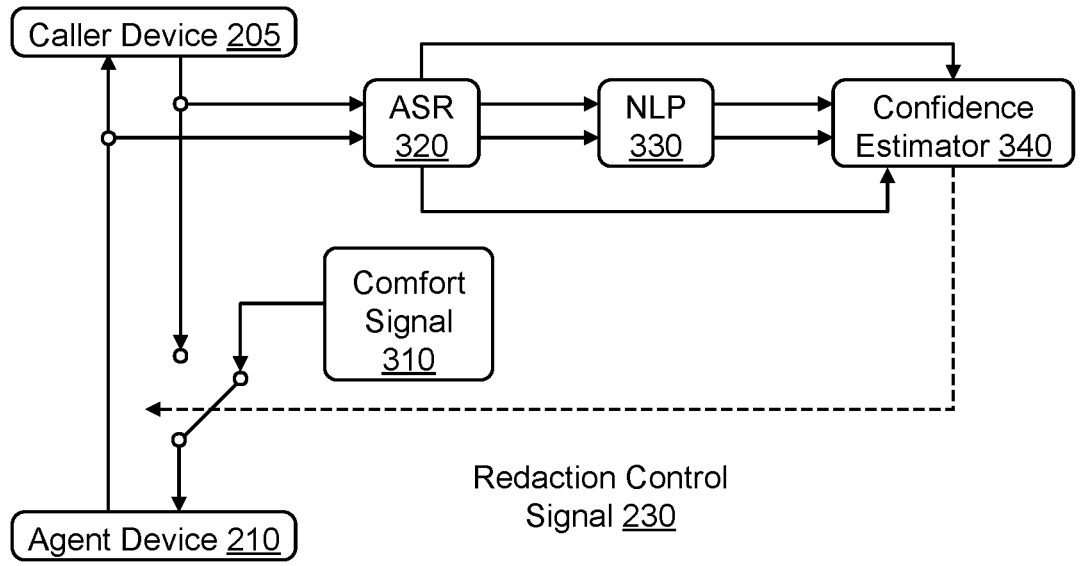
FIG. 3C illustrates an example embodiment in which SPI collection is prompted by a caller introduction or by an agent introduction.

FIG. 3C illustrates an example embodiment in which SPI collection is prompted by a caller introduction or by an agent introduction. Similar to the scenario of FIG. 3B, the masking system 100 activates masking in response to an agent request, an introductory phrase from the caller, or a partial string of SPI received from the caller. In the example of FIG. 3C, the ASR 320, NLP 330, and confidence estimator 340 process both agent audio from the agent device 210 and caller audio from the caller device 205. For example, phrases and prompts spoken by the agent such as "Please tell me your phone number," are used as features to give clues as to whether the caller is saying SPI or about to say SPI.

In both the example embodiments of FIG. 3B and FIG. 3C, a model is trained to recognize both the introductory conversation elements that preface the start of the SPI information and the SPI information itself. For example, in the utterance "My phone number is 555-434-1877," the introductory conversation element is "My phone number is," and the SPI information is the string of digits making up the phone number. Accuracy of the models used by the ASR 320, NLP 330, and confidence estimator 340 may depend on requirements and specifications of the masking system 100. If the agent is allowed to hear some number of digits at the start of a string of SPI, the ASR 320 can observe more of the caller audio and make a more accurate determination of whether SPI is being spoken. For example, the agent may hear the first five digits of a phone number while the last five digits are masked. The model accuracy may also depend on the maximum delay provided for in the customer-to-agent audio path. Longer delays allow the masking system 100 to observe more characters of a string of SPI while passing fewer on to the agent. Additionally, the model accuracy may be affected by the number of SPI elements that the masking system 100 is trained to look for and what type of information the SPI contains. Defining a longer list of SPI types may increase the risk of false triggering.

In one embodiment, a method for masking SPI for the scenarios of FIGS. 3B and 3C include the following. The masking system 100 is active. In the case of FIG. 3B, the ASR 320 is listening to audio received from the caller device 205 and in the case of FIG. 3C, the ASR 320 is listening to audio received from both the caller device 205 and the agent device 210. The agent may request SPI from the caller. In the scenario of FIG. 3C, the components of the real-time redactor 110 respond by raising the confidence level that the caller is about to provide SPI.

The caller begins a preamble such as "Sure, my card number is," and the real-time redactor 110 detects the caller preamble and raises the confidence level. If the accumulated confidence from the agent and/or caller utterances is sufficiently high (e.g., above a predetermined threshold value) the real-time redactor 110 may send a redaction control signal 230 to the ingress media gateway 105 to initiate masking.

The caller begins to recite SPI. The real-time redactor 110 detects the beginning of SPI and initiates masking (if it was not previously initiated). Meanwhile, a comfort signal is played to the agent so the agent knows that the caller is speaking. In the case of DTMF provided by the caller, the comfort signal may be a flat or a random, set of DTMF tones. The ASR 320 processes the masked audio (and preceding audio if appropriate) to extract relevant content, which may be SPI or some other response from the caller such as a question or comment that the information is unavailable. As digits (or other characters or words of SPI) are recognized, symbols may be displayed on the agent desktop, masking the SPI.

The real-time redactor 110 determines when the caller input of SPI is complete, for example, based on completion criteria such as a number of digits received, or a silence gap in the caller audio. The extracted content of the caller audio is forwarded to the organization for processing, for example, via the SPI collector 120. The content may include the requested SPI, an indicator that the information was not provided or that nothing was spoken, or classifications of other relevant questions or comments the caller may have spoken.

The real-time redactor 110 detects that the caller has stopped providing SPI. Accordingly, the ingress media gateway 105 unmasks the caller audio. Depending on the content of the masked segment, part or all of the redacted caller audio may be "unredacted" and played back to the agent at an increased speed to catch up to the caller's real-time audio. In some embodiments, such replay may begin while masking is still active for the real-time audio.

At any point in the above described process, such as after the agent or caller has spoken, the confidence level determined by the confidence estimator 340 may surpass a predetermined threshold value. In such cases, the real-time redactor 110 may determine that SPI is being provided by the caller and may send a redaction control signal 230 to the ingress media gateway 105 to begin masking.

Figure 3D:
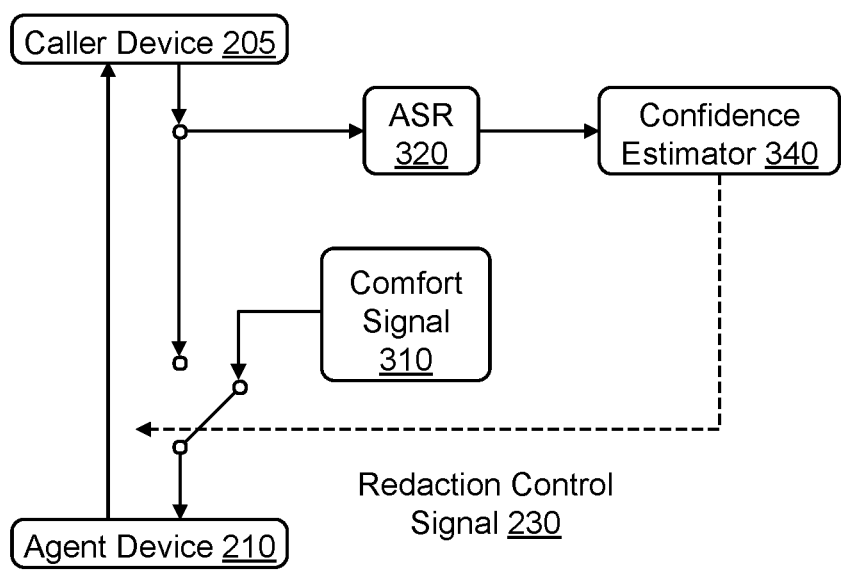
FIG. 3D illustrates an example embodiment in which SPI collection is prompted by detection of SPI.

FIG. 3D illustrates an example embodiment in which SPI collection is prompted by detection of SPI. For example, unlike the other described embodiments in which masking begins in response to prompts from the caller or the agent about upcoming SPI, in this scenario, masking is activated by detection of SPI, such as a digit string, spoken by the caller without introductory phrasing.

The embodiment shown in FIG. 3D includes the ASR 320 configured to recognize the caller audio and the confidence estimator 340 which generates a confidence score based on the output of the ASR 320, the confidence score representing a likelihood that the received caller audio includes SPI. Since only the private SPI is used to trigger redaction, the NLP 330 is unnecessary. Unless a delay is added to the caller audio, the agent will receive a first portion of the SPI in this embodiment.

In some embodiments, one or more implementations as demonstrated in FIGS. 3A-3D are used singly or in combination. For example, redaction may be triggered if any of the architectures detect SPI or a likelihood of upcoming SPI. The masking system 100 may be configured to address each of the four scenarios simultaneously, including responding to speech and DTMF input from the caller. In such embodiments, some components, such as the ASR 320 may be shared among the multiple SPI detection processes.

Figure 4:
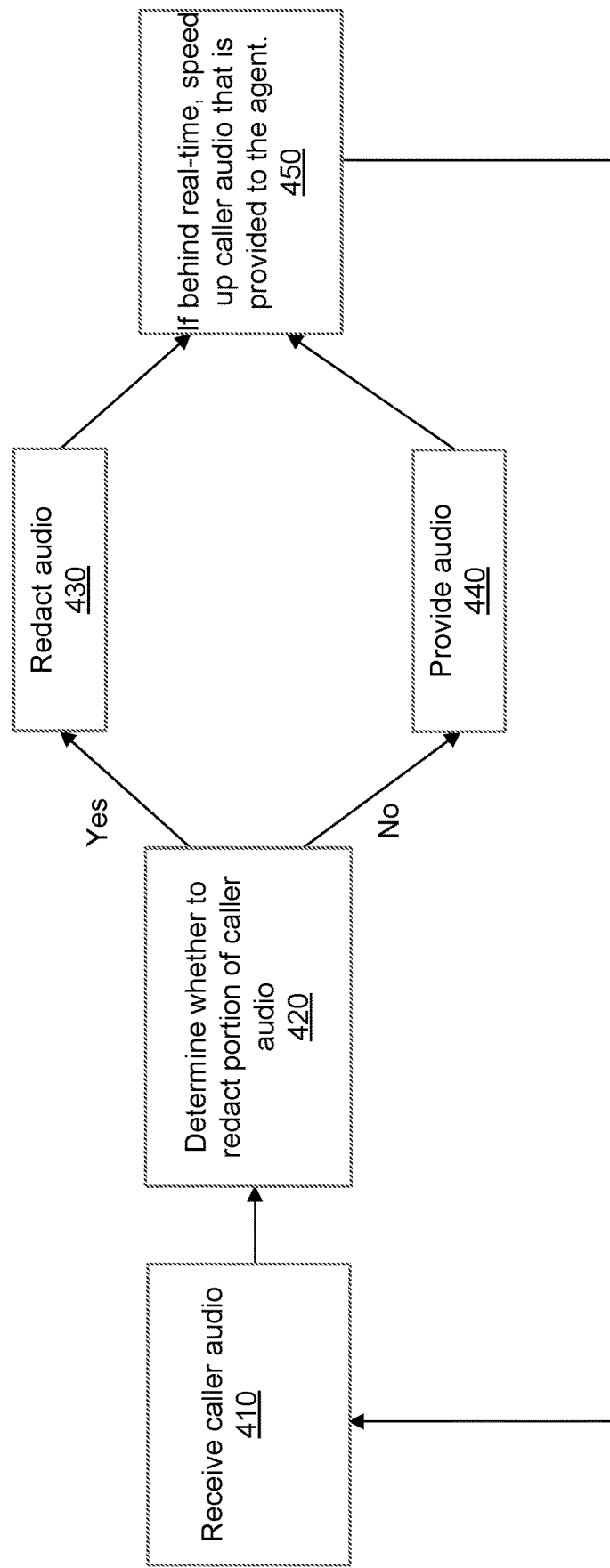
FIG. 4 is a high level data flow diagram that illustrates a process by which audio sent to an agent is caught up to real-time after SPI redaction, in accordance with an embodiment.

FIG. 4 is a high level data flow diagram that illustrates a process by which audio sent to an agent is caught up to real-time after SPI redaction, in accordance with an embodiment. The masking system 100 receives 410 caller audio, for example, when a caller is communicating with an agent. The masking system determines 420 whether to redact a portion of the received caller audio and either redacts 430 the portion of caller audio, or provides 440 the portion of caller audio to the agent. As described previously, the redaction process can introduce a delay between the time that the caller speaks the caller audio and the time that the agent hears the caller audio. For example, the masking system 100 may use a fraction of a second to analyze the received caller audio to decide whether it contains SPI and should be redacted. If the caller audio that is being sent to the agent is behind real-time (i.e., the agent is hearing audio that the caller spoke more than some predetermined amount of time in the past rather than audio that the caller is currently speaking), the masking system may speed up 450 the caller audio that is played to the agent until the agent is caught up to the real-time caller audio, e.g., by changing the audio data so that when played back the audio plays at a faster rate.

Various embodiments of the four presented scenarios may be viewed as a single scenario in which different features are available for use in making the decision to redact. In one embodiment, SPI detection is responsive to one or more features, some of which may not be available in every instance of SPI detection, such as an agent setting a signal, one or more agent utterances, one or more caller utterances, and various confidence scores based on information from the ASR 320 and NLP 330 components. The confidence estimator 340 may include a model trained to determine a confidence score based on various combinations of the available features.

At various points in disclosure, the ASR 320 is described as working with a confidence estimator or classifier to detect an SPI event. In one embodiment, this detection is based on the ASR 320 outputting one or more features that are related to how well the spoken phrase from caller audio fit one or more of a set of acoustic, language, intent, and confidence models. In another embodiment, the detection is based on features output from the NLP 330 combined with features output by the ASR 320. Features may be combined to give a confidence score using one or more of several algorithms, including applying a threshold to a likelihood score, comparing the best vs. next-best output score from the ASR 320 or NLP 330 or both, providing scores as input to a neural network where a confidence score is an output, applying a maximum entropy model, and using a support vector machine (SVM).

For SPI detection, the ASR may be configured, using language models (or LMs), statistical language models (SLMs), or grammars (such as GRXML grammars). In one embodiment, key phrases by the agent or caller are detected by a grammar comprising various ways caller audio may be worded. In another embodiment, an SLM is constructed to represent typical speech patterns found in phrases from caller or agent audio. In another embodiment, part or all of the agent/caller conversation is transcribed and the text transcript is scanned for key phrases or input to an NLP 330 that extracts meaning (such as intents or events) from word patterns. This NLP 330 may be able to recognize, independent of which among many various wordings are used, one or more intents such as an agent asking for a card number or a customer saying he/she doesn't have a card number handy.

In one embodiment, the masking system 100 may include a DTMF detector component that provides fast and reliable detection, for example, as a part of the real-time redactor 110. In the scenario of FIG. 3A, a DTMF detector may be activated in response to a signal from the agent, detection of a DTMF tone, or other factors. In the scenarios of FIGS. 3B-D, the DTMF detector listens continuously and activates masking and collection when DTMF is detected. Once a predetermined period of time passes with no DTMF or once a predetermined number of digits has been collected, redaction may end. The number of digits may depend on the dialog state and the content of the DTMF digits collected so far. To avoid playing a portion of the first digit to the agent, so that the agent is not exposed to a loud signal, a small delay (e.g., 20 ms) may be added into the caller-to-agent audio path. DTMF tones are detected by the masking system 100 and masked as flat or random tones to an agent, or masked text in the agent desktop. The DTMF tones may be captured as beeps or digits in the call recordings. Collected DTMF digits are passed to a call center system or to a payment processor of the organization.

The following are example embodiments for executing the ASR. It may be desirable to reduce the computational load of the ASR since it can represent a dominant factor in the overall computational load.

In one embodiment, a small grammar is constructed. The grammar includes phrases a caller and agent are expected to say. The ASR processes data in word spotting mode.

In a second embodiment, a full call transcription module may be constructed to maximize accuracy. The model may be trained on recordings of conversations between agents and callers. The model may be trained to focus on phrases most likely to be found during or near redaction events in a conversation.

In some embodiments, a small grammar may be used to detect SPI until an alert status or certain confidence level is achieved, at which point the larger model may be invoked. This situation can help to reduce hardware requirements of the masking system 100, as the ASR may be activated only when the agent is prompting SPI collection.

Other Considerations

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure. Persons skilled in the relevant art can appreciate that an audio stream is merely presented as one example communication medium, and that the system described herein could be applied to communication using other media including audio, video, text, and images.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by one or more computer processors for performing any or all of the steps, operations, or processes described.

Embodiments may also relate to an apparatus for performing the operations herein. This apparatus may be specially constructed for the required purposes, or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A computer-implemented method, performed by a computer system, for masking sensitive personal information (SPI) of a caller from an agent, the computer system configured to receive a stream of media in real time from the caller and to provide the stream of media to the agent, the method comprising:
    receiving a first portion of the stream of media in real time from the caller;
    prior to receiving a next portion of the stream of media, determining a likelihood that the next portion of the stream of media will include SPI by inputting the first portion of the stream of media received from the caller into a natural language processing (NLP) model that is trained on features of SPI to recognize phrases indicating forthcoming SPI;
    generating a predicted length of time that the next portion of the stream of media will include SPI by inputting the first portion of the stream of media received from the caller into a machine learning model that is trained to predict a length of time for a redaction;
    responsive to the determined likelihood exceeding a threshold value:
        receiving the next portion of the stream of media in real time from the caller;
        and
        masking, for the predicted length of time, the next portion of the stream of media as it is received in real time such that the agent does not receive the next portion of the stream of media containing the identified SPI.

2. The computer-implemented method of claim 1, wherein the media stream is an audio stream comprising a conversation between the caller and the agent and wherein determining the likelihood that the next portion of the stream of media will include SPI comprises generating a text version of the received first portion of the stream of media.

3. The computer-implemented method of claim 1, further comprising:
    receiving a prompting media stream sent to the caller and originating from the agent;
    providing information from the prompting media stream originating from the agent as input to a natural language processor; and
    receiving, from the natural language processor, information about contents of the prompting media stream originating from the agent;
    wherein determining the likelihood that the next portion of the stream of media received from the caller will include SPI is further based on the information received from the natural language processor.

4. The computer-implemented method of claim 1, further comprising:
    determining a likelihood that the first portion of the stream of media from the caller includes SPI; and
    responsive to the determined likelihood that the first portion of the stream of media from the caller includes SPI exceeding a threshold value:
        collecting the SPI from the first portion of the stream of media; and
        masking the first portion of the stream of media such that the agent does not receive the first portion of the stream of media.

5. The computer-implemented method of claim 1, further comprising:
    training the NLP model to recognize SPI prompts, wherein SPI prompts include a second agent asking for a value from a user, or a user announcing an upcoming value.

6. The computer-implemented method of claim 1, wherein the media stream from the caller is delayed before being provided to the agent, the method further comprising:
    playing a delayed portion of the stream of media from the caller to the agent at an increased speed.

7. The computer-implemented method of claim 1, further comprising:
    analyzing subsequent portions of the stream of media from the caller to determine whether the subsequent portions of the stream of media include SPI; and responsive to determining that a subsequent portion of the stream of media from the caller does not include SPI:
resuming transmission of the portions of the stream of media from the caller to the agent at an increased speed.

8. A non-transitory computer-readable storage medium storing computer program instructions executable by one or more processors of a system, to perform steps for masking sensitive personal information (SPI) of a caller from an agent, the system configured to receive a stream of media in real time from the caller and to provide the stream of media to the agent, the steps comprising:
receiving a first portion of the stream of media in real time from the caller;
prior to receiving a next portion of the stream of media, determining a likelihood that the next portion of the stream of media will include SPI by inputting the first portion of the stream of media received from the caller into a natural language processing (NLP) model that is trained on features of SPI to recognize phrases indicating forthcoming SPI;
generating a predicted length of time that the next portion of the stream of media will include SPI by inputting the first portion of the stream of media received from the caller into a machine learning model that is trained to predict a length of time for a redaction;
responsive to the determined likelihood exceeding a threshold value:
receiving the next portion of the stream of media in real time from the caller; and
masking, for the predicted length of time, the next portion of the stream of media as it is received in real time such that the agent does not receive the next portion of the stream of media containing the identified SPI.

9. The non-transitory computer-readable storage medium of claim 8 wherein the media stream is an audio stream comprising a conversation between the caller and the agent and wherein determining the likelihood that the next portion of the stream of media will include SPI comprises generating a text version of the received first portion of the stream of media.

10. The non-transitory computer-readable storage medium of claim 8, the steps further comprising:
receiving a prompting media stream sent to the caller and originating from the agent;
providing information from the prompting media stream originating from the agent as input to a natural language processor; and
receiving, from the natural language processor, information about contents of the prompting media stream originating from the agent;
wherein determining the likelihood that the next portion of the stream of media received from the caller will include SPI is further based on the information received from the natural language processor.

11. The non-transitory computer-readable storage medium of claim 8, the steps further comprising:
determining a likelihood that the first portion of the stream of media from the caller includes SPI; and
responsive to the determined likelihood that the first portion of the stream of media from the caller includes SPI exceeding a threshold value:
collecting the SPI from the first portion of the stream of media; and
masking the first portion of the stream of media such that the agent does not receive the first portion of the stream of media.

12. The non-transitory computer-readable storage medium of claim 8, the steps further comprising:
training the NLP model to recognize SPI prompts, wherein SPI prompts include a second agent asking for a value from a user or a user announcing an upcoming value.

13. The non-transitory computer-readable storage medium of claim 8 wherein the media stream received from the caller is delayed before being provided to the agent, the method further comprising:
playing a delayed portion of the stream of media received from the caller to the agent at an increased speed.

14. The non-transitory computer-readable storage medium of claim 8, the steps further comprising:
analyzing subsequent portions of the stream of media from the caller to determine whether the subsequent portions of the stream of media include SPI; and
responsive to determining that a subsequent portion of the stream of media from the caller does not include SPI:
resuming transmission of the portions of the stream of media from the caller to the agent at an increased speed.

15. A computer system comprising:
one or more computer processors for executing computer program instructions; and
a non-transitory computer-readable storage medium storing instructions for masking sensitive personal information (SPI) of a caller from an agent, the system configured to receive a stream of media in real time from the caller and to provide the stream of media to the agent, the instructions executable by the one or more computer processors to perform steps comprising:
receiving a first portion of the stream of media in real time from the caller;
prior to receiving a next portion of the stream of media, determining a likelihood that the next portion of the stream of media will include SPI by inputting the first portion of the stream of media received from the caller into a natural language processing (NLP) model that is trained on features of SPI to recognize phrases indicating forthcoming SPI;
generating a predicted length of time that the next portion of the stream of media will include SPI by inputting the first portion of the stream of media received from the caller into a machine learning model that is trained to predict a length of time for a redaction;
responsive to the determined likelihood exceeding a threshold value:
receiving the next portion of the stream of media in real time from the caller; and
masking, for the predicted length of time, the next portion of the stream of media as it is received in real time such that the agent does not receive the next portion of the stream of media containing the identified SPI.

16. The computer system of claim 15 wherein the media stream is an audio stream comprising a conversation between the caller and the agent and wherein determining the likelihood that the next portion of the stream of media will include SPI comprises generating a text version of the received first portion of the stream of media.

17. The computer system of claim 15, the steps further comprising:
   receiving a prompting media stream sent to the caller and originating from the agent;
   providing information from the prompting media stream originating from the agent as input to a natural language processor; and
   receiving, from the natural language processor, information about contents of the prompting media stream originating from the agent;
   wherein determining the likelihood that the next portion of the stream of media received from the caller will include SPI is further based on the information received from the natural language processor.

18. The computer system of claim 15, the steps further comprising:
   determining a likelihood that the first portion of the stream of media from the caller includes SPI; and
   responsive to the determined likelihood that the first portion of the stream of media from the caller includes SPI exceeding a threshold value:
      collecting the SPI from the first portion of the stream of media; and
      masking the first portion of the stream of media such that the agent does not receive the first portion of the stream of media.

19. The computer system of claim 15, the steps further comprising:
   training the NLP model to recognize SPI prompts, wherein SPI prompts include a second agent asking for a value from a user or a user announcing an upcoming value.

20. The computer system of claim 15 wherein the media stream from the caller is delayed before being provided to the agent, the method further comprising:
   playing a delayed portion of the stream of media from the caller to the agent at an increased speed.

* * * * *